United States Patent
Buck

(10) Patent No.: US 11,693,165 B2
(45) Date of Patent: Jul. 4, 2023

(54) THIN FILM OPTICS

(71) Applicant: LOCKHEED MARTIN CORPORATION, Bethesda, MD (US)

(72) Inventor: Joseph Robert Buck, Superior, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 826 days.

(21) Appl. No.: 16/435,410

(22) Filed: Jun. 7, 2019

(65) Prior Publication Data

US 2019/0377116 A1 Dec. 12, 2019

Related U.S. Application Data

(60) Provisional application No. 62/683,521, filed on Jun. 11, 2018.

(51) Int. Cl.
*G02B 5/30* (2006.01)
*G03H 1/04* (2006.01)

(52) U.S. Cl.
CPC ......... *G02B 5/3016* (2013.01); *G03H 1/0402* (2013.01); *G03H 2001/0439* (2013.01); *G03H 2222/31* (2013.01); *G03H 2222/36* (2013.01); *G03H 2240/11* (2013.01)

(58) Field of Classification Search
CPC ............... G02B 5/3016; G03H 1/0402; G03H 2240/11; G03H 2222/31; G03H 2222/36
See application file for complete search history.

(56) References Cited

U.S. PATENT DOCUMENTS

| | | | | |
|---|---|---|---|---|
| 2008/0278675 | A1* | 11/2008 | Escuti | G02B 5/1833 359/485.02 |
| 2013/0027656 | A1* | 1/2013 | Escuti | G02B 5/3083 349/193 |
| 2015/0331167 | A1* | 11/2015 | Escuti | G03H 1/0476 359/3 |
| 2016/0161648 | A1* | 6/2016 | Gu | G02B 5/1833 430/321 |

FOREIGN PATENT DOCUMENTS

WO WO 2014/062615 A2 4/2014

OTHER PUBLICATIONS

Extended European Search Report from European Patent Application No. 19820353.1, dated Feb. 7, 2022, 9 pages.
Kim, Jihwan et al., "Fabrication of ideal geometric-phase holograms with arbitrary wavefronts", Optica, vol. 2, No. 11, Nov. 20, 2015, pp. 958-964.
Conkey, Donald B. et al., "High-speed scattering medium characterization with application to focusing light through turbid media", Optics Express, vol. 20, No. 2, Jan. 11, 2012, pp. 1733-1740.

* cited by examiner

*Primary Examiner* — Elizabeth A Burkhart
(74) *Attorney, Agent, or Firm* — BakerHostetler

(57) ABSTRACT

A method of manufacturing a thin film optical apparatus includes providing a substrate and applying an alignment layer over the substrate. The alignment layer ranges from about 50 to 100 nm in thickness. The method includes imprinting a hologram with a desired optic pattern onto the alignment layer and applying at least one layer of mesogen material over the alignment layer.

12 Claims, 8 Drawing Sheets

THIN FILM OPTICS

CROSS-REFERENCES TO RELATED APPLICATIONS

This application claims priority under 35 U.S.C. § 119 to Provisional Application No. 62/683,521 filed on Jun. 11, 2018, in the United States Patent and Trademark Office, the entire contents of which is incorporated herein by reference for all purposes.

STATEMENT REGARDING FEDERALLY SPONSORED RESEARCH OR DEVELOPMENT

Not applicable.

TECHNICAL FIELD

This disclosure relates in general to optics and optical systems, and in particular to, for example, without limitation, thin film optics with a geometric phase to allow for high performance, and true free-form optics that can be achromatic, polarization-independent, and applies to both transmissive and reflective optics.

BACKGROUND

Conventional optics use a varying spatial profile with either distance or varying distance through a material with different index of refraction to impart a spatial profile of phase on a wavefront. This is true for both transmissive and reflective optics. While there has been much progress in improving manufacturing techniques, the same method of manufacturing optical elements employed over hundreds of years are still being used. While some newer materials allow for higher index of refraction with high transmission than was possible in the past, similar manufacturing constraints and mass production requirements remain as they have for the past several decades.

A novel and practical approach for low mass, low cost manufacturing of advanced and/or high performance optics and optical systems are desirable.

SUMMARY

One or more implementations of the present disclosure provide a method of manufacturing a thin film optical apparatus including providing a substrate and applying an alignment layer over the substrate. The alignment layer may range from about 50 to 100 nm in thickness. The method may further include imprinting a hologram with a desired optic pattern onto the alignment layer and applying at least one layer of mesogen material over the alignment layer. The optical apparatus may range in the order of about one-half to one wavelength thick.

One or more implementations of the present disclosure provide a method of manufacturing an optical apparatus, including providing a substrate and applying at least one alignment layer above the substrate. The method may further include writing a polarization phase hologram into the at least one alignment layer to impart the phase transform of a desired optical pattern, and applying at least one layer of birefringent material over the alignment layer. The optical apparatus may range in the order of one-half to one wavelength in thickness.

The description in this summary section may provide some illustrative examples of the disclosure. This section is not intended to be a broad overview or to identify essential elements of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various configurations of the subject technology and is not intended to represent the only configurations in which the subject technology may be practiced. The detailed description includes specific details for the purpose of providing a thorough understanding of the subject technology. However, it will be apparent to those skilled in the art that the subject technology may be practiced without these specific details.

Figure 1A:
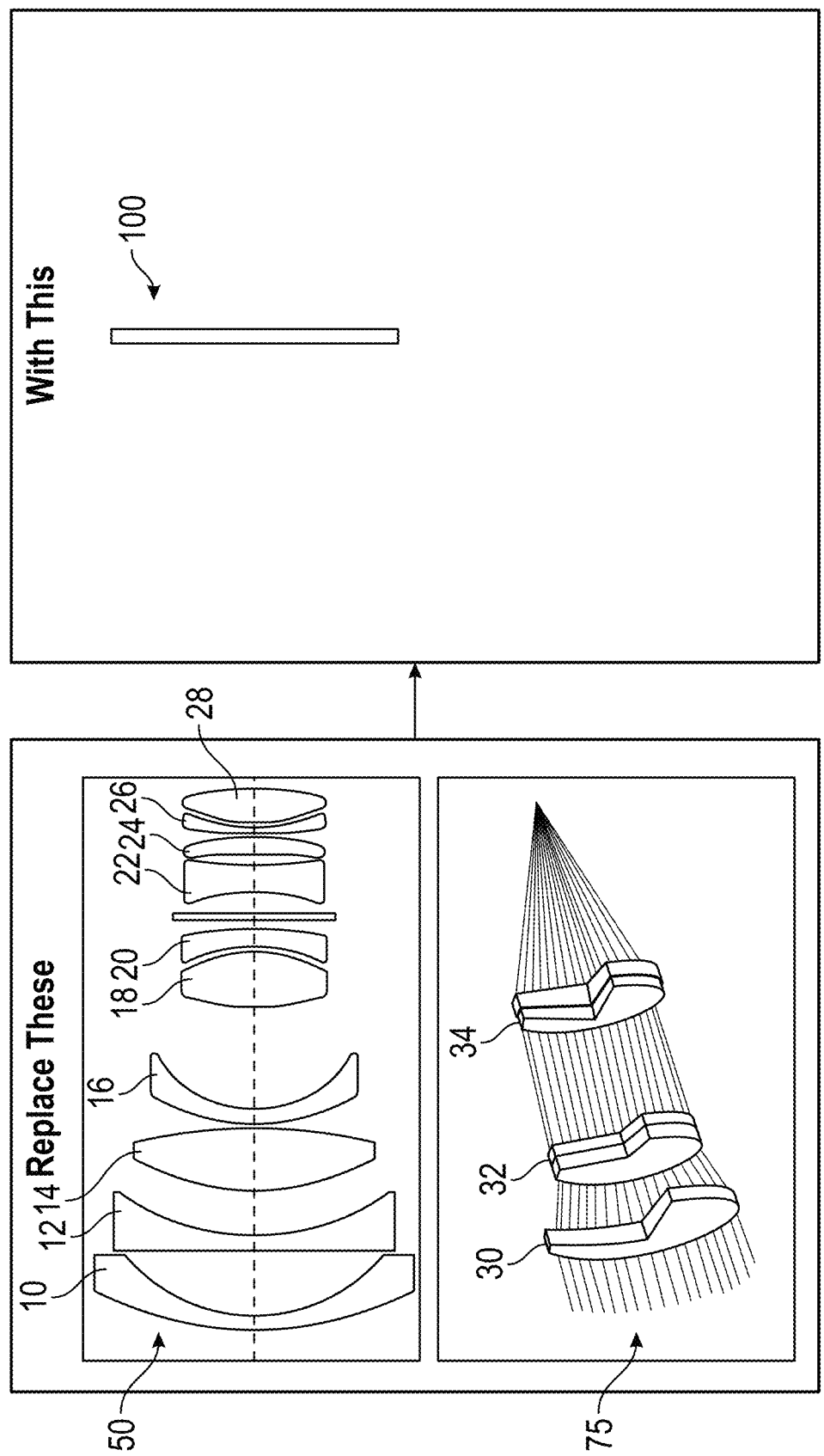
FIG. 1A illustrates an exploded view of conventional or currently existing optical apparatuses (shown on the left) as compared with the thin film optical apparatus of the various embodiments of the present disclosure (shown on the right).

FIG. 1A illustrates an exploded view of conventional or currently existing optical apparatuses 50, 75 (on the left) as compared with the thin film optical apparatus 100 of the various embodiments of the present disclosure (shown on the right). As depicted, the currently existing optical apparatuses typically employ a several lenses. For example, optical apparatus 50 includes lenses 10, 12, 14, 16, 18, 20, 22, 24, 26, and 28, and optical apparatus 75 includes lenses 30, 32, and 34 which can be bulky and complex in structure. The currently existing optical apparatuses include these optical elements (lenses) for the purpose of correcting for different types of aberrations. In these conventional optical elements, each of the lenses is constrained by manufacturability and the dispersion of available materials constrains the design of the optical apparatus. In contrast, the thin film optical apparatus 100 of the present disclosure, as illustrated in FIG. 1A, replaces all of the complex and bulky elements of the currently existing optical apparatuses with a thin film optical apparatus 100. The thin film optical apparatus 100 may include a plurality of thin layers such that the overall size of the thin film optical apparatus 100 is on the order of a wavelength or less in thickness. For example, in some embodiments, the overall size of the thin film optical apparatus 100 may be range between one-half to one wavelength in thickness. The thin film optical apparatus 100 of the various embodiments described herein may be advantageously formed as a single element formed of a thin film applied to either a reflective or transmissive substrate. As shall be described in further detail below, due to the decreased part count, the reduction in complexity of the optical apparatus 100 as compared to currently existing optical apparatuses, and the ability to leverage scalable manufacturing techniques as well as currently existing materials advantageously allow for production of a low-cost thin film optical apparatus 100 that can be rapidly manufactured and cheaply manufactured.

Figure 1B:
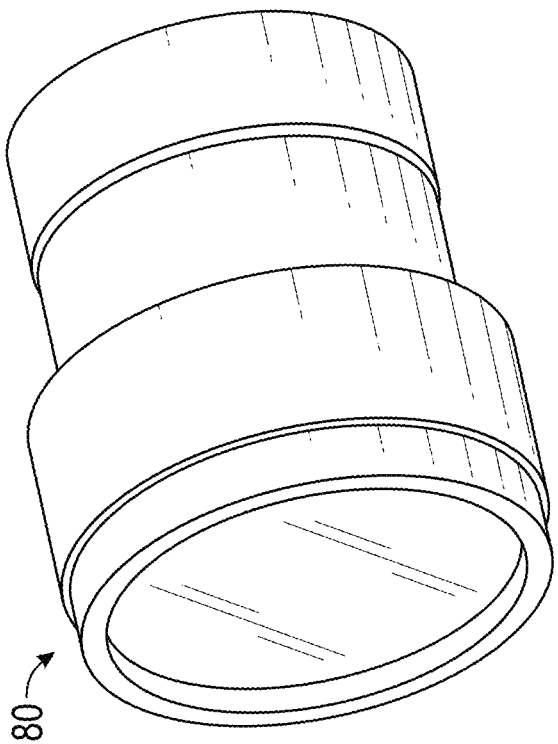
FIG. 1B is an illustration of a currently existing mid-wave infrared (MWIR) optical apparatus compared with a thin film mid-wave infrared MWIR optical apparatus of the various embodiments of the present disclosure.
Figure 1B:
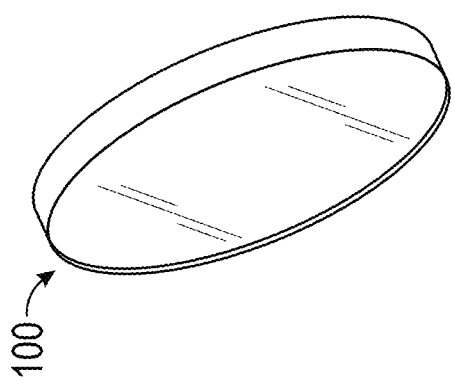

FIG. 1B is an illustration of a currently existing mid-wave infrared (MWIR) optical apparatus 80 compared with a thin film mid-wave infrared (MWIR) optical apparatus 100 of the various embodiments of the present disclosure. As can be seen from the visual comparison, the thin film MWIR optical apparatus 100 with a single substrate is orders-of-magnitude reduced in thickness as compared to the currently existing MWIR optical apparatus 80. In particular, the thin film MWIR optical apparatus 100 has a structure providing orders-of-magnitude of reduction in size, weight, and cost as compared to the currently existing MWIR optical apparatus 80. This is due at least in part to the fact that the currently existing MWIR optical apparatus 80 has multiple lenses, causing it to have a higher overall weight about 220 g versus about 35 g of the thin film MWIR optical apparatus 100. Additionally, the currently existing MWIR optical apparatus 80 has a complex structure and is difficult to customize, thereby coming with a purchase price tag of about significantly higher than the cost to manufacture the thin film MWIR optical apparatus 100. For example, the cost of manufacturing thin film MWIR optical apparatus 100 may be approximately 98.5% cheaper than the price tag associated with the existing MWIR optical apparatus 80.

Accordingly, and as shall be described in further detail below, various embodiments of the present disclosure are directed to providing low-cost, rapid-turnaround, high-performance arbitrary optics in the form of a thin film lens to replace currently existing complex bulk optics and mirrors.

In accordance with various embodiments of the present disclosure, the technology and inventive concepts as disclosed herein relate to practical implementations of geometric phase to allow high performance optics with a low-cost film that is on the order of a wavelength or less in thickness. The disclosure includes true free-form optics that can be achromatic and independent in polarization, among others. The disclosure also includes optical systems related to both transmissive (or transparent) optics and reflective optical components.

Figure 2:
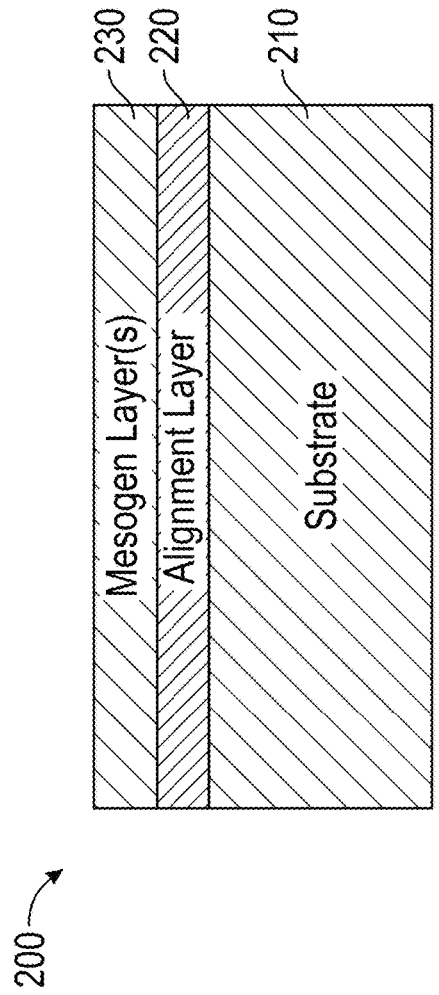
FIG. 2 illustrates a true free-form thin film optical apparatus, including details of the structure of an achromatic, polarization-independent optical component, according to various embodiments of the present disclosure.

In some aspects, the subject disclosure provides methods and practical implementations of a geometric phase to allow high performance optics with a low-cost film that is on the order of a wavelength or less in thickness. FIG. 2 illustrates a true free-form thin film optical apparatus 200, including details of the structure of an achromatic, polarization-independent optical component. The thin film optical apparatus 200 is similar in structure to the thin film optical apparatus 100. In accordance with various embodiments, the thin film optical apparatus 200 may include a substrate 210, an alignment layer 220 applied over the substrate 210, and at least one layer of mesogen material 230 applied over the alignment layer 220. In some embodiments, the substrate 210 may either be a reflective substrate or a transmissive substrate. In embodiments where the substrate 210 is a transmissive substrate, the substrate 210 may be a transparent substrate. In other embodiments, where the substrate 210 is a reflective substrate layer, the substrate 210 may be a dielectric or metallic substrate. In these embodiments, the thin film optical apparatus 200 may further include a reflective layer applied onto the substrate, where the reflective layer may be dielectric or metallic.

In accordance with various embodiments of the present disclosure, the substrate may provide stability for the at least one thin film layers coated or otherwise applied thereon. For example, the substrate layer 210 may provide stability for the alignment layer 200. The material of the substrate 210 may depend on wavelength of the incident light. For example, the material of the substrate 210 may include but not be limited to fused silica, silicon, optical glass (N-BK7 types), sapphire, zinc selenide, germanium, and calcium fluoride. In particular, the material of the substrate 210 may be chosen to provide the desired stiffness and optical transmission for the wavelength band of interest. The alignment layer 220 may be configured to maintain holographic alignment of the layer of mesogen material 230 to the alignment layer 220. The alignment layer 220 of the various embodiments described herein may be developed to replace buffing in displays of conventional optical apparatuses which is a labor intensive mechanical process. In the thin film optical apparatus 200 of the various embodiments described herein, the alignment layer 220 is coated or otherwise applied to the substrate 210, and then the layer of mesogen material 230 is coated or otherwise applied over the alignment layer 220. In some embodiments, the layer of mesogen material 230 may be a polymerizable liquid crystal that provides birefringence. The material of the mesogen layer 230 may be developed to provide required retardance in displays. In accordance with some embodiments, the alignment layer may be a very thin layer, typically about 50 to 100 nm in thickness. As such, the overall thickness of the thin film optical apparatus 200 may be minimal, and on the order of about 200 nm to about 2000 nm in thickness.

According to various embodiments, the disclosed technology and inventive concepts may include the use of a polarization based holographic interferometer to impart a geometric phase. This concept further includes conversion of a binary amplitude hologram to a phase hologram. In some instances, this process can be performed within a Mach-Zehnder interferometer. In some embodiments, the process may also include writing a polarization phase hologram in a birefringent material to impart the phase transform of a desired optical element.

Figure 3:
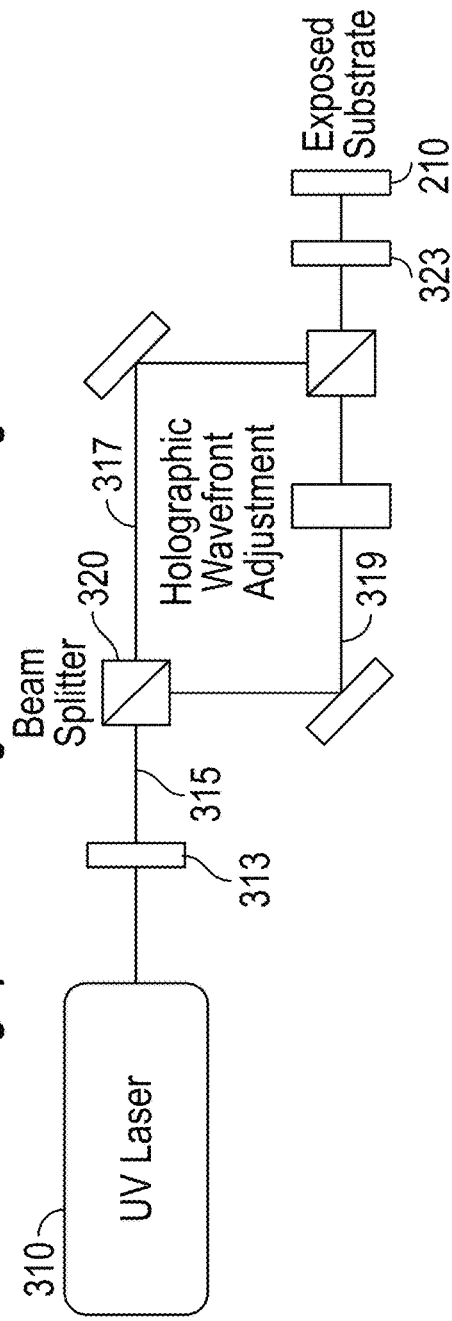
FIG. 3 illustrates a method of manufacturing the thin film optical apparatus in accordance with various embodiments of the present disclosure.

FIG. 3 illustrates a method of manufacturing the thin film optical apparatus 200 in accordance with various embodiments of the present disclosure. As briefly described above, the method of manufacturing the thin film optical apparatus 200 (shown in FIG. 2) may include providing the substrate 210, coating, depositing, or otherwise applying the alignment layer over the substrate 210 and imprinting a hologram with a desired optic pattern onto the alignment layer 220. The alignment layer 220 may be applied to the substrate using a spin coater, a roll bar, and/or point-by-point deposition. The alignment layer 220 may then be annealed. In some embodiments, imprinting the hologram onto the alignment layer 220 includes producing a hologram with a desired optic pattern by setting up a desired wavefront in a holographic interferometer. As depicted in FIG. 3, the hologram with the desired optic pattern may be produced by imparting a geometric phase utilizing a polarization based holographic interferometer. The polarization based holographic interferometer may be a Mach-Zehnder interferometer.

In the depicted embodiments, the hologram is imprinted onto the alignment layer 220 using an ultraviolet (UV) laser 310 to make an interferometer. In these embodiments, a waveplate 313 may be used that alter the polarization state of the incident light beam 315 travelling through it from the UV laser 310. The incident light beam 315 from the UV laser 310 may be split into two different paths 317 and 319 using a beamsplitter 320, and the polarization on the two paths 317 and 319 may be controlled and then the beams from the two paths 317 and 319 may be recombined as illustrated in FIG. 3, to create the interference pattern of the hologram. In some embodiments, prior to recombining beams from the two paths 317 and 319, a profile of the beam of the path 319 may be adjusted relative to that of the beam of path 317 to create the polarization hologram. A waveplate 323 may then be used to alter the polarization state of the recombined beam. The resulting polarization hologram with the desired optical pattern may then be written or imprinted on the alignment layer 220 (shown in FIG. 2) by exposing the polarization hologram for as long as it takes to imprint that phase profile on the alignment layer 220, usually around one minute. The alignment layer 220 with the imprinted phase profile may then be deposited, coated or otherwise applied to the exposed substrate 210.

The method of manufacturing the thin film optical apparatus 200 may further include applying the layer of mesogen material 230 to the alignment layer 220. In some embodiments, the layer of mesogen material 230 may be applied to the alignment layer 220 using a spin coater, a roll bar, and/or point-by-point deposition. The layer of mesogen material 230 may then be annealed with heat, cured with UV in an oxygen-free environment, and/or polymerized to produce the thin film optical apparatus 200. In some embodiments, additional alignment and mesogen layers 220 and 230 may be added to the thin film optical apparatus 200. In these embodiments, an additional alignment layer may be applied over the layer of mesogen material 230, and subsequent layers of mesogen material and alignment layers may be sequentially deposited above and aligned to the additional alignment later. The aforementioned configuration with the multiple layers may be advantageous to make the thin film optical apparatus 200 a slightly thicker if this is desired for the intended purpose. In some embodiments, the applying at least one layer of mesogen material 230 may include applying at least two orthogonally oriented layers of mesogen material 230 over the alignment layer. Accordingly, the optical apparatus may range in the order of about one-half to one wavelength in thickness. The thin film optical apparatus 200 of the various embodiments described herein is advantageous in that it leverages readily available materials from the display industry.

According to various embodiments of the present disclosure, imparting the geometric phase utilizing a polarization based holographic interferometer may include converting a binary amplitude hologram to a phase hologram.

Figure 4:
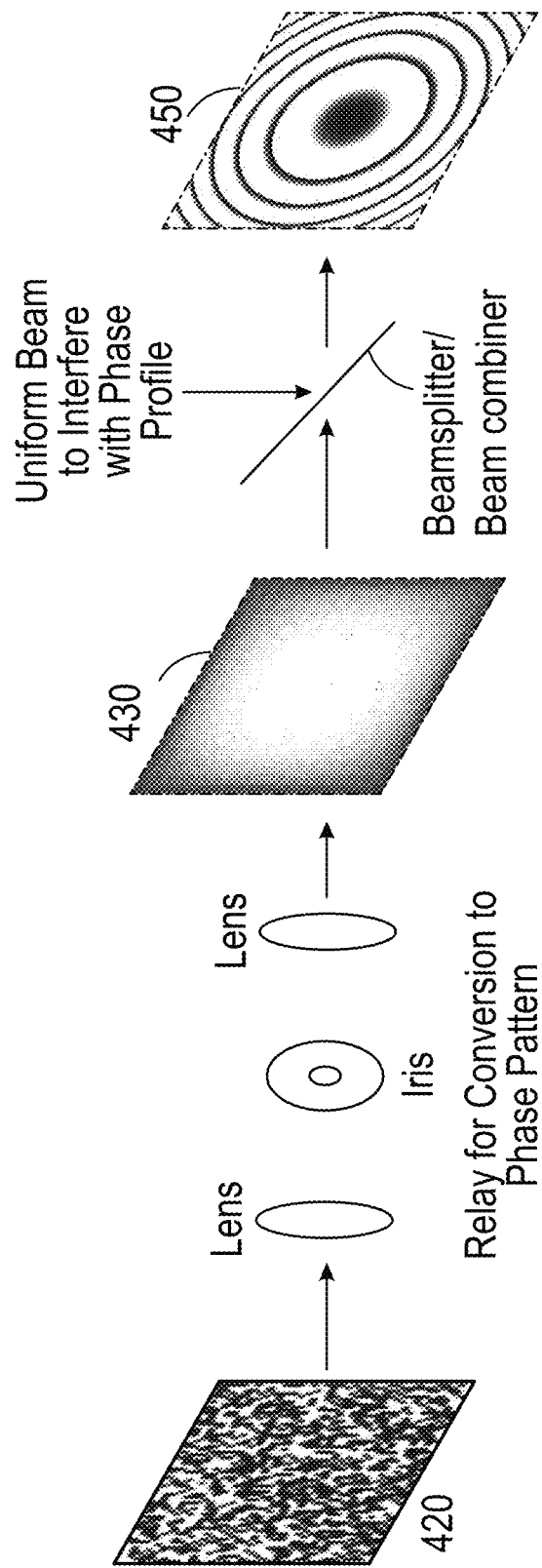
FIG. 4 illustrates a method and apparatus for converting a binary amplitude hologram to a phase hologram in accordance with various embodiments of the present disclosure.

FIG. 4 illustrates a method and apparatus for converting a binary amplitude hologram to a phase hologram. In some embodiments, the desired pattern for the thin film optical apparatus 200 can be generated using an interferometer with the appropriate bulk optics to create the polarization interference pattern. However, in other embodiments, a polarization based spatial light modulator may be used in one path and interfere with a local oscillator in the other path. A common issue with phase base spatial light modulators is the limited resolution and difficulty in operating efficiently at the UV wavelengths needed for patterning. The method of manufacturing the thin film optical apparatus of the various embodiments described herein may thus use an amplitude based spatial light modulator, which can achieve high resolution (i.e., high number of pixels) with a micro-mirror array that works well in the UV. As illustrated in FIG. 4, the binary amplitude pattern 420 may then be converted to a phase pattern 430, which is then mixed with the coherent local oscillator to generate the desired polarization interference pattern 450. This enables arbitrary control to within the resolution of the device.

Figure 5B:
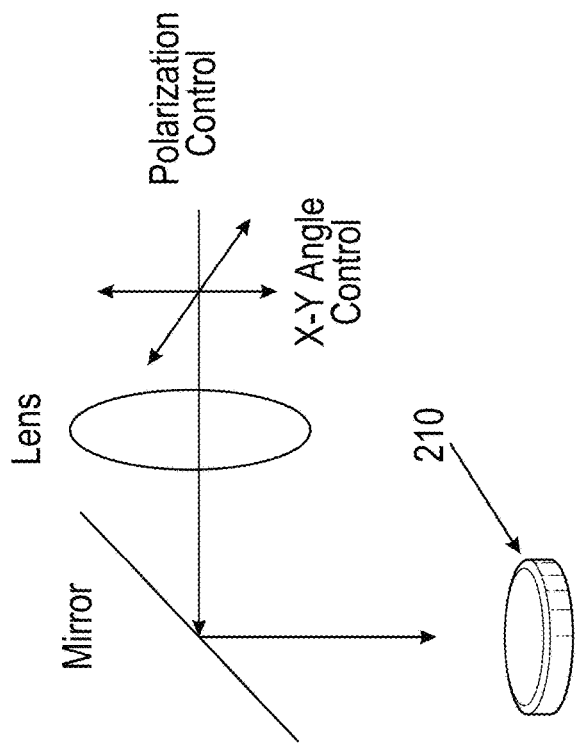
FIGS. 5A and 5B illustrate methods and apparatus for rastering an incident light beam with phase control in accordance with various embodiments of the present disclosure.
Figure 5A:
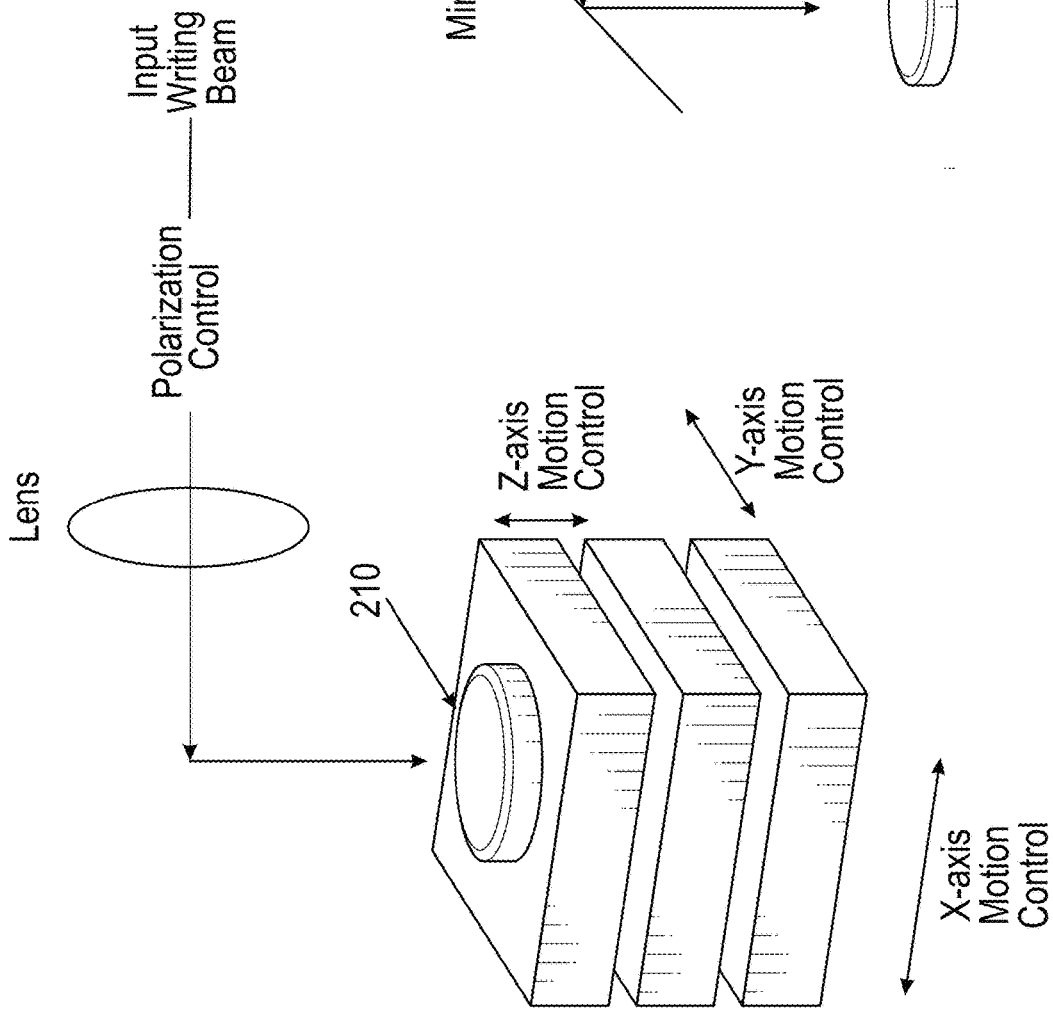

In some embodiments, imprinting the hologram onto the alignment layer 220 includes rastering an incident light beam with phase control. FIGS. 5A and 5B illustrate methods and apparatus for rastering an incident light beam with phase control. In the embodiments of FIGS. 5A and 5B, a diffraction limited spot that may be equal to or smaller than the desired hologram feature size may be illuminated by an input writing beam. For example, in the embodiments illustrated in FIG. 5A, the substrate 210 may be moved along the Z-axis (Z-axis motion control) in order to accurately position the substrate 210 at the focus point of the lens as well as to provide desired resolution of the produced holographic pattern. This is due to the fact that the resolution of the holographic pattern produced is limited by how well in focus the substrate 210 is with respect to the lens. The substrate 210 may then be moved along the X- and Y-axes of motion, and the polarization of the input writing beam may be controlled to yield the desired holographic pattern. In some embodiments, the phase and illumination duration may controlled to provide the required exposure energy to align the alignment material (e.g., alignment layer 220 illustrated in FIG. 2) on the substrate 210. In the embodiments illustrated in FIG. 5B, the substrate 210 may be fixed and the illumination (input writing) beam may be steered while the phase and illumination duration may be controlled to provide the required exposure optical energy for the desired holographic pattern. For example, in the embodiments illustrated in FIG. 5B, polarization control and X-Y angle control may both be performed on the input writing beam. A mirror may be used to perform the X-Y angle control and to ensure that the substrate 210 is accurately positioned at the focus point of the lens. In accordance with various embodiments of the present disclosure, the rastering methods of FIGS. 5A and 5B may be combined with the previously described patterning illumination methods (e.g., of FIG. 4) to provide a scaling of the patterns for a mosaicked hologram across larger substrates.

The disclosed technology and inventive concepts thus include a combination of several techniques to allow true free-form optics to be designed and fabricated as imprinted holograms in an optically thin birefringent film.

According to various embodiments of the present disclosure, a combination of two or more birefringent layers can be used to provide an arbitrary achromatic lens. In such instances, the application of the alignment and birefringent layers can be directed to a transparent substrate for a transmissive lens. In other instances, the application of the alignment and birefringent layers can be directed to a reflective substrate (either dielectric or metallic) for a reflective optical element. The alignment layer can have a thickness from about 10 nm to about 200 nm. The birefrigent layer can have a thickness ranging from about one quarter (0.25%) to about one wavelength (100%) and depends on the birefrigence of the material. In some embodiments, the wavelength can be from about 400 nm to about 15,000 nm.

Figure 6:
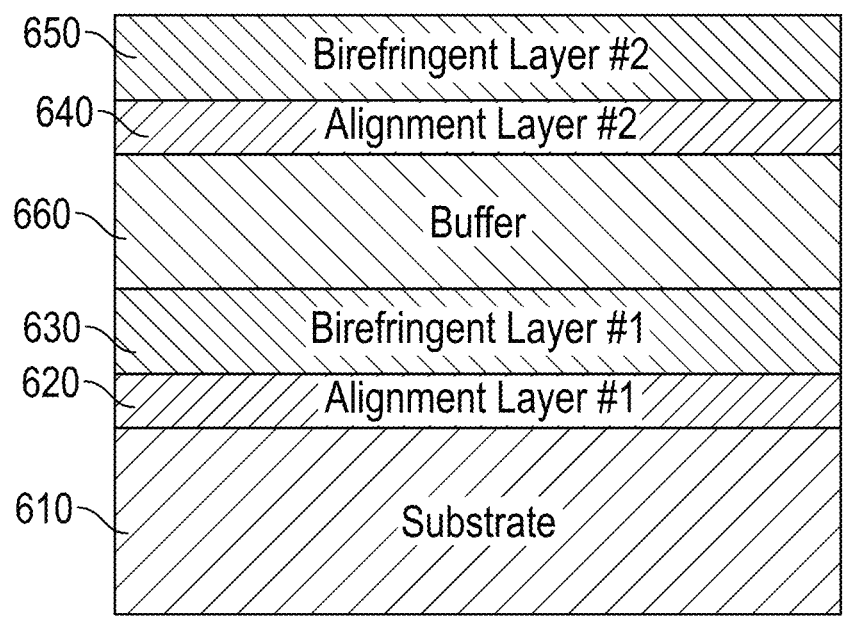
FIG. 6 illustrates achromatic methods of manufacturing the thin film optical apparatus using two or more birefringent layers according to various embodiments of the present disclosure.

FIG. 6 illustrates achromatic methods of manufacturing the thin film optical apparatus using two or more birefringent layers according to various embodiments of the present disclosure. In accordance with various embodiments of the present disclosure, a method of manufacturing a thin film optical apparatus may include providing a substrate 610, applying at least two alignment layers 620 and 640 above the substrate 610, and applying at least one layer of birefringent material 630, 650 over each respective alignment layer 620, 640. In some embodiments, the applying at least two alignment layers and the applying at least one layer of birefringent material over each alignment layer may include applying a first alignment layer 620 over the substrate 610, and applying a first layer of birefringent material 630 over the first alignment layer 620. The method may further include applying a second alignment layer 640 over the first layer of birefringent material 630, and applying a second layer of birefringent material 650 over the second alignment layer. In some embodiments, the second layer of birefringent material 650 may be oriented orthogonally relative to the first layer of birefringent material 630. The method may further include positioning a buffer layer 660 between the first layer of birefringent material 630 and the second alignment layer 640.

The various embodiments depicted in FIG. 6 illustrate two lenses (birefringent layers 630 and 650) with different focal lengths that are combined to form an achromatic optic. The various methods illustrated and described in FIG. 6 utilize two different thin film lenses (i.e., birefringent layers 630 and 650) sandwiched together, each optimized for a different wavelength and focal length, such that the combination along with the thickness of the buffer layer 660 provides a balanced optic across the desired wavelength band. In contrast, traditional or currently existing achromatic optical apparatuses use two different dispersion profiles in order to accomplish the aforementioned configuration, typically with a positive and negative lens. Accordingly, the thin film optical apparatus 600 of the various embodiments described herein advantageously has more flexibility to trade wavelength with spatial profile and buffer thickness. In accordance with some embodiments, the alignment layers 620, 640 may measure about 50 nanometers in thickness, and the layers of birefringent material 630, 650 may measure between about 200 to 2000 nanometers thick. In some embodiments, the buffer layer may measure between 10 microns to 5 millimeters in thickness, which may depends greatly on the optical bandwidth and type of optic.

In accordance with various embodiments, similar to the method of manufacturing the thin film optical apparatus 200, the method of manufacturing the thin film optical apparatus 600 may include writing a polarization phase hologram into the alignment layers 620, 640 to impart the phase transform of a desired optical pattern. As described above, the method may include imprinting the hologram onto each of the alignment layers 620, 640 and producing a hologram with a desired optic pattern by setting up a desired wavefront in a holographic interferometer. As previously described with respect to FIG. 3, the hologram with the desired optic pattern may be produced by imparting a geometric phase utilizing a polarization based holographic interferometer. The polarization based holographic interferometer may be a Mach-Zehnder interferometer.

As previously described with respect to FIG. 3, the hologram may be imprinted onto each of the alignment layers 620, 640 in sequence using an ultraviolet (UV) laser 310 to make an interferometer. In these embodiments, an incident light beam such as beam 315 from the UV laser 310 may be split into two different paths 317 and 319 using a beamsplitter 320 (illustrated in FIG. 3), and the polarization on the two paths 317 and 319 may be controlled and then the beams from the two paths 317 and 319 may be recombined as illustrated in FIG. 3, to create the interference pattern of the hologram. In some embodiments, prior to recombining beams from the two paths 317 and 319, a profile of the beam of the path 319 may be adjusted relative to that of the beam of path 317 to create the polarization hologram. The resulting polarization hologram with the desired optical pattern may then be written or imprinted onto the first alignment layer 620 by exposing the polarization hologram for as long as it takes for to imprint that phase profile on the alignment layer 620, usually around one minute. The alignment layer 620 with the imprinted phase profile may then be deposited, coated or otherwise applied to the exposed substrate 610.

The method of manufacturing the thin film optical apparatus 600 may further include applying the first layer of birefringent material 630 to the first alignment layer 620. In some embodiments, the first layer of birefringent material 630 may be applied to the first alignment layer 620 using a spin coater, a roll bar, and/or point-by-point deposition. The first layer of birefringent material 630 may then be annealed with heat, cured with UV in an oxygen-free environment, and/or polymerized. The process may then be repeated for the second alignment layer 640 and the second layer of birefringent material 650. For example, the second alignment layer 640 may be applied above the first layer of birefringent material 630, and the second layer of birefringent material 650 may be applied over the second alignment layer 640. In some embodiments, the second layer of birefringent material 650 may be applied to the second alignment layer 640 using a spin coater, a roll bar, and/or point-by-point deposition. The second layer of birefringent material 630 may then be annealed with heat, cured with UV in an oxygen-free environment, and/or polymerized.

In some embodiments, the first layer of birefringent material 630 and the first alignment layer 620 may have a thickness and lens prescription optimized for a first wavelength, and the second layer of birefringent material 650 and the second alignment layer 640 may have a thickness and lens prescription optimized for a second wavelength. The buffer layer thickness may be another variable to optimize for the resulting lens profile to provide uniformity across the desired wavelength band, along with the spatial profile in the first and second layers.

Additional alignment and birefringent layers may be added to the thin film optical apparatus 600 in a similar manner.

According to various embodiments of the present disclosure, imparting the geometric phase utilizing a polarization based holographic interferometer may include converting a binary amplitude hologram to a phase hologram.

In some embodiments, similar to the embodiments described with respect to FIG. 4, the desired pattern for the thin film optical apparatus 600 can be generated using an interferometer with the appropriate bulk optics to create the polarization interference pattern. The method of manufacturing the thin film optical apparatus 600 of the various embodiments described herein may thus use an amplitude based spatial light modulator, which can achieve high resolution (i.e., high number of pixels) with a micro-mirror array that works well in the UV. Similar to the embodiments of FIG. 4, the binary amplitude pattern may then be converted to a phase pattern, which is then mixed with the coherent local oscillator to generate the desired polarization interference pattern. This enables arbitrary control to within the resolution of the device.

Figure 7B:
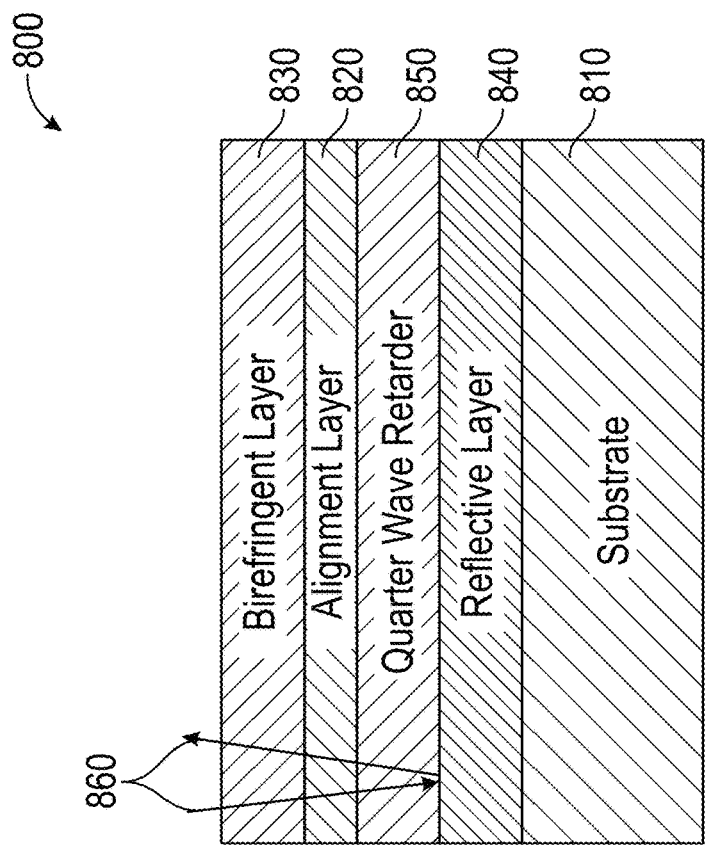
FIG. 7B illustrates a polarization independent methods of manufacturing a thin film reflective optical apparatus using multiple passes in a single birefringent layer according to various embodiments of the present disclosure.
Figure 7A:
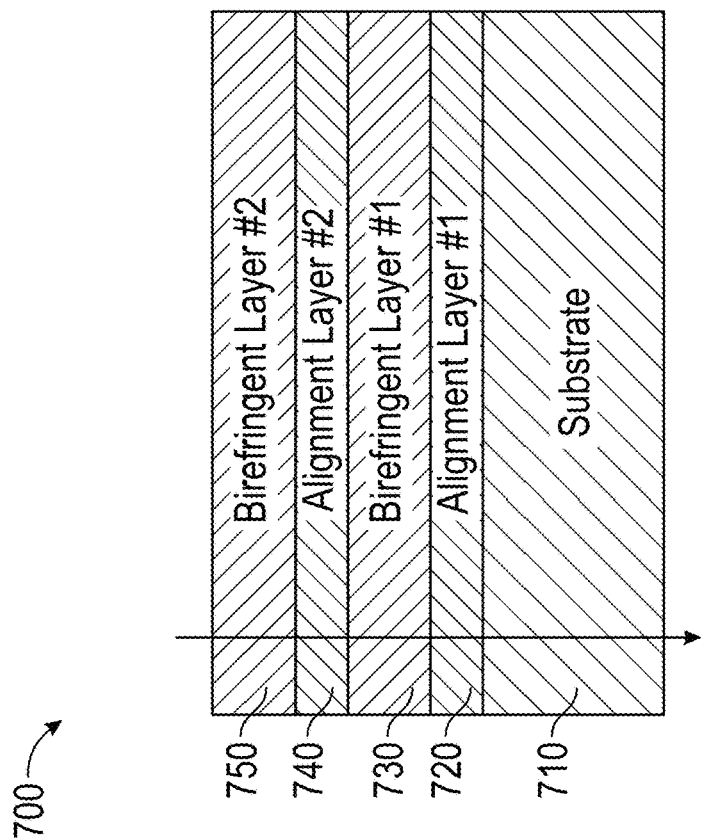
FIG. 7A illustrates polarization independent methods of manufacturing a thin film transmissive optical apparatus using orthogonal birefringent layers according to various embodiments of the present disclosure.

FIG. 7A illustrates polarization independent methods of manufacturing a thin film transmissive optical apparatus 700 using orthogonal birefringent layers according to various embodiments of the present disclosure. In accordance with various embodiments of the present disclosure, a method of manufacturing the thin film optical apparatus 700 may include providing the substrate 710, applying at least two alignment layers 720 and 740 above the substrate 710, and applying at least one layer of birefringent material 730, 750 each the respective alignment layer 720, 740. The structure of the thin film optical apparatus 600 of the embodiments of FIG. 7A is similar to that of FIG. 6, except without the buffer layer 660, thus a detailed description of the method of manufacture and the structure thereof shall be omitted.

In the embodiments of FIG. 7A, the substrate may be a transparent transmissive substrate, and the first and second layers of birefringent material 730 and 750 may be positioned orthogonally with respect to each other. As depicted, the materials are oriented so that the first layer of birefringent material 730 and the first alignment layer 720 act on a first polarization state, and the second layer of birefringent material 750 and the second alignment layer 740 act on the a polarization state orthogonal to the first polarization state.

FIG. 7B illustrates a polarization independent methods of manufacturing a thin film reflective optical apparatus 800 using multiple passes in a single birefringent layer according to various embodiments of the present disclosure. The method of manufacturing the thin film reflective optical apparatus 800 may include providing a substrate 810, applying at least one alignment layer 820 above the substrate 810, writing a polarization phase hologram into the at least one alignment layer 820 to impart the phase transform of a desired optical pattern, and applying at least one layer of birefringent material 830 over the alignment layer 820. The optical apparatus may range in the order of about one-half to one wavelength in thickness.

In accordance with various embodiments, similar to the method of manufacturing the thin film optical apparatus 200, the method of manufacturing the thin film optical apparatus 800 may include writing a polarization phase hologram into the alignment layer 820 to impart the phase transform of a desired optical pattern. As described above, the method may include imprinting the hologram onto the alignment layer 820 and producing a hologram with a desired optic pattern by setting up a desired wavefront in a holographic interferometer. As previously described with respect to FIG. 3, the hologram with the desired optic pattern may be produced by imparting a geometric phase utilizing a polarization based holographic interferometer. The polarization based holographic interferometer may be a Mach-Zehnder interferometer.

As previously described with respect to FIG. 3, the hologram may be imprinted onto the alignment layers 820 in using an ultraviolet (UV) laser to make an interferometer. In these embodiments, an incident light beam such as beam 315 from the UV laser 310 may be split into two different paths 317 and 319 using a beamsplitter 320 (illustrated in FIG. 3), and the polarization on the two paths 317 and 319 may be controlled and then the beams from the two paths 317 and 319 may be recombined as illustrated in FIG. 3, to create the interference pattern of the hologram. In some embodiments, prior to recombining beams from the two paths 317 and 319, a profile of the beam of the path 319 may be adjusted relative to that of the beam of path 317 to create the polarization hologram. The resulting polarization hologram with the desired optical pattern may then be written or imprinted on the alignment layer 820 by exposing the polarization hologram for as long as it takes for to imprint that phase profile on the alignment layer 820, usually around one minute. The alignment layer 820 with the imprinted phase profile may then be deposited, coated or otherwise applied to the exposed substrate 810.

The method of manufacturing the thin film optical apparatus 600 may further include applying the layer of birefringent material 830 over the alignment layer 820. In some embodiments, the layer of birefringent material 830 may be applied to the alignment layer 820 using a spin coater, a roll bar, and/or point-by-point deposition. The first layer of birefringent material 830 may then be annealed with heat, cured with UV in an oxygen-free environment, and/or polymerized. In the embodiments of FIG. 7B, the method may further include positioning a layer of reflective material 840 and a retarder 850 between the alignment layer and the substrate. The retarder 850 may be a quarter wave retarder, and the reflective layer may be dielectric or metallic. The retarder 850 may switch which polarization state is acted upon by the birefringent layer 830 depending on which direction the incident light 860 is traveling.

Figure 8B:
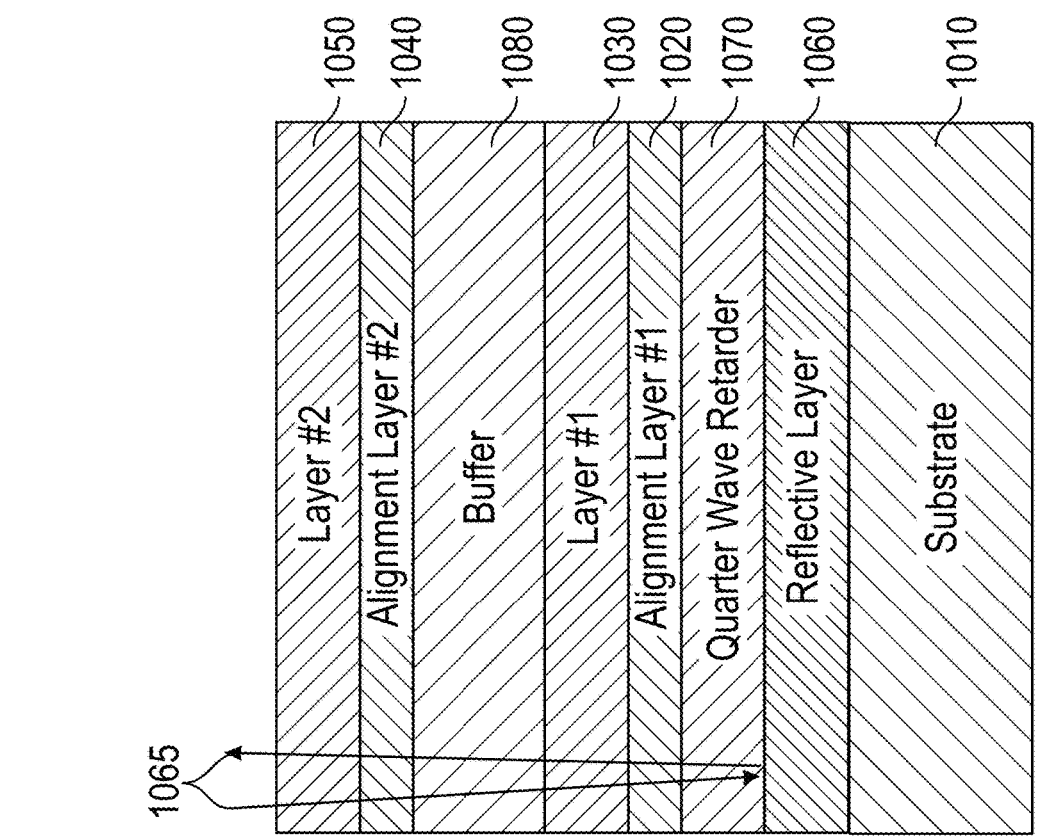
FIG. 8B illustrates a combination of achromatic and polarization independent layers for a thin film reflective optical apparatus according to various embodiments of the present disclosure.
Figure 8A:
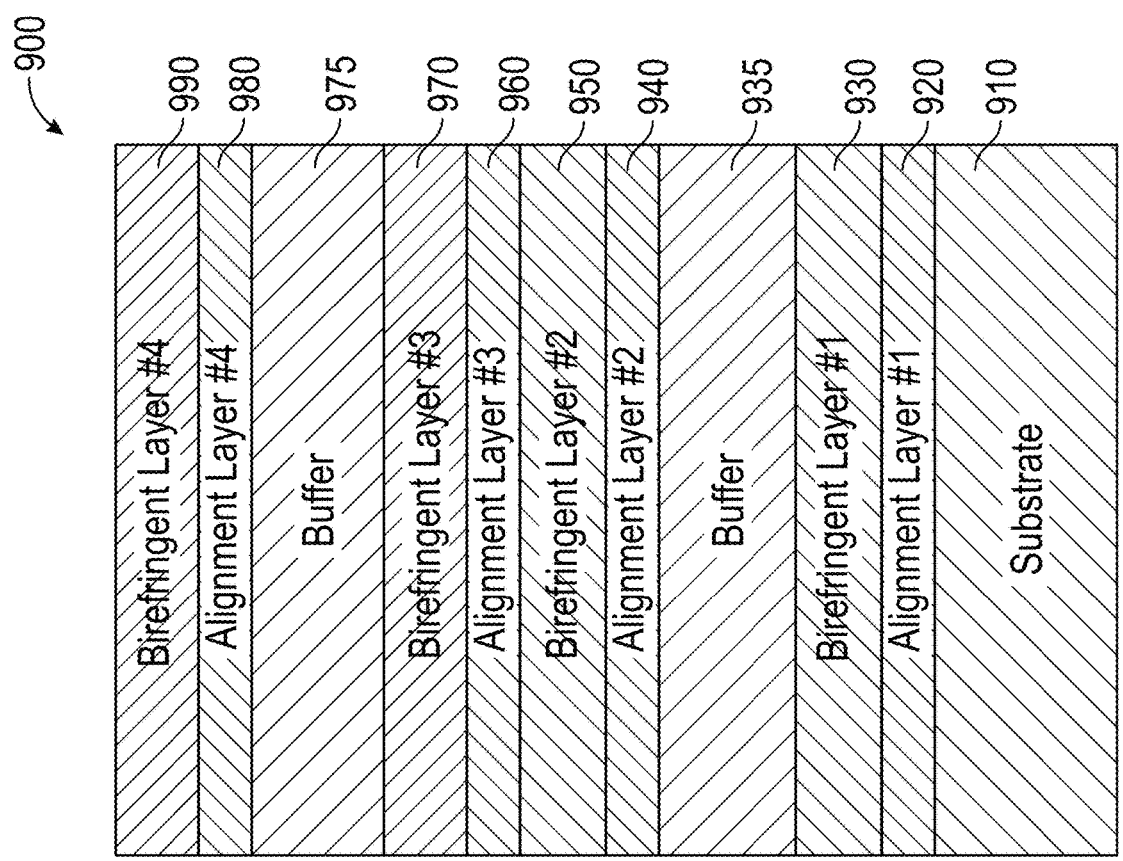
FIG. 8A illustrates a combination of achromatic and polarization independent layers for a thin film transmissive optical apparatus according to various embodiments of the present disclosure.

FIG. 8A illustrates combination of achromatic and polarization independent layers for a thin film transmissive optical apparatus. In accordance with various embodiments of the present disclosure, a method of manufacturing the thin film transmissive optical apparatus 900 may include providing the substrate 910, applying at least four alignment layers 920, 940, 960, and 980 above the substrate 910, and applying at least one layer of birefringent material 930, 950, 970, and 990 over each respective alignment layer 920, 940, 960, and 980. The structure of the thin film optical apparatus 900 of the embodiments of FIG. 8A is similar to that of FIG. 7A, except with additional buffer layers 935 and 975, additional third and fourth alignment layers, 960 and 980, and additional third and fourth layers of birefringent material 970 and 990, thus a detailed description of the method of manufacture and the structure thereof shall be omitted.

In the embodiments of FIG. 8A, the substrate 910 may be a transparent transmissive substrate, and the pair of first and second layers 930 and 950 of birefringent material, as well as the pair of third and fourth layers of birefringent material 970 and 990 may be positioned orthogonally with respect to each other. As depicted, the layers are oriented so that the first and second layers of birefringent material 930 and 950, the first and second alignment layers 920 and 940, along with the buffer layer 935 provide an achromatic lens for a first polarization state. The third and fourth layers of birefringent material 970 and 990, the third and fourth alignment layers 960 and 980, along with the buffer layer 975 provide a complementary achromatic lens for a second polarization state orthogonal to the first polarization state.

FIG. 8B illustrates combination of achromatic and polarization independent layers for a thin film reflective optical apparatus 1000. In accordance with various embodiments of the present disclosure, a method of manufacturing the thin film reflective optical apparatus 1000 may include providing the substrate 1010, applying at least two alignment layers 1020 and 1040 above the substrate 1010, and applying at least one layer of birefringent material 1030 and 1050 over each respective alignment layer 1020 and 1040. The structure of the thin film optical apparatus 1000 of the embodiments of FIG. 8B is similar to that of FIG. 7B, except with additional buffer layer 1080, additional second alignment layer 1040, and additional second layer of birefringent material 1050, thus a detailed description of the method of manufacture and the structure thereof shall be omitted.

In the embodiments of FIG. 8B, the substrate 1010 may be a reflective substrate, and first and second layers 1030 and 1050 of birefringent material may be positioned orthogonally with respect to each other. As depicted, the layers are oriented so that the first and second layers of birefringent material 1030 and 1050, the first and second alignment layers 1020 and 1040, along with the buffer layer 1080 provide an achromatic lens for a first polarization state. The quarter wave retarder flips which polarization state is acted upon on the second pass of the beam 1060 through the layers. Similar to the previously described embodiments, the thin film reflective optical apparatus 1000 may range from about 200 nm to 2000 nm thick. In some embodiments, the substrate may measure 2 to 5 millimeters, the alignment layers may measure about 50 nanometers, the birefringent layers may measure about 200 to 2000 nanometers. The quarter wave retarder may measure about 150 to 800 nanometers, and the buffer layers may measure 10 microns to 5 millimeters depending on the optic design.

The combination of achromatic and polarization independent techniques advantageously enables designing and fabrication of both transmissive and reflective optical elements.

According to various embodiments of the present disclosure, methods of manufacturing a thin film optical apparatus as disclosed herein may include a fabrication process for controlling the exposure of the alignment layer hologram in its entirety, or in some instances, in parts that are distributed in time. Said in another way, the exposure can be controlled as desired spatially or temporally. This flexibility of exposure control allows utilizing of large substrates (i.e., 10 inches-30 inches) in producing large optical elements by tracking the phase offsets for each portion as it is being exposed. In some instances, the exposure of optical elements is performed either with or without rotational symmetry. In instances using a rotational symmetry, the resulting optical films have uniform or substantially uniform thicknesses. In instances without rotational symmetry, the resulting optical films have spatially varying thicknesses. In some embodiments, the thickness variation of the optical film can be from about 0.01% to about 10% across the optical film. In some embodiments, the thickness of the optical film can be from about half the thickness of the wavelength to about twice the thickness of the wavelength; and the wavelength can be from about 400 nm to about 15,000 nm. Regardless, varying the thickness of the film in order to vary wavelength have great impacts on the resulting spatial dispersion.

In some embodiments as disclosed herein, the combination of wavefront control and wavelength selectivity can be a factor in the design and fabrication of the true free-form optics, for example, with hyperspectral imaging.

While there have been advances in applying metamaterial techniques in the optical domain, the lithographic techniques are not scalable given cost, time, and equipment requirements. For example, current solutions to fabrication rely heavily on either mechanical or etching methods, while most of the existing techniques for manufacturing optical components rely on rotational symmetry. In all existing technologies, the limitations seem to be related to the available index of refraction and spatial profiles. In contrast, the technology and inventive concepts described herein allows the use of low-cost materials, while leveraging scalable manufacturing techniques. The methods described as set forth above are suitable for producing optically thin films and materials with high performance. The holographic representation allows using completely arbitrary wavefronts, with fast-turnaround, and low-cost optical elements. This represents a true free-form optic capability.

Various embodiments of the subject technology may be implemented in, for example, various optical systems, including for example, optical imaging apparatuses, lenses, and telescopes.

Various embodiments of the subject technology may be implemented in, for example, directed energy applications, materials and manufacturing technologies and advanced materials.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one of, or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method of manufacturing a thin film optical apparatus, the method comprising:
   providing a substrate;
   applying an alignment layer over the substrate, wherein the alignment layer ranges from about 50 to 100 nm in thickness;
   imprinting a hologram with an optic pattern onto the alignment layer by:
      imparting a geometric phase utilizing a polarization based holographic interferometer to convert a binary amplitude hologram to a phase hologram, and
      mixing the phase hologram with an oscillator;
   applying at least one layer of mesogen material over the alignment layer; and
   positioning a layer of reflective material between the alignment layer and the substrate.

2. The method of claim 1, further comprising curing and polymerizing the mesogen layer.

3. The method of claim 1, wherein the applying the layer of mesogen material comprises spin coating the layer of mesogen material onto the alignment layer and aligning the layer of mesogen material over the alignment layer.

4. The method of claim 1, wherein imprinting the hologram comprises writing a polarization phase hologram into the alignment layer to impart a phase transform of the optical pattern, and wherein the method further comprises applying at least one layer of birefringent material over the alignment layer.

5. The method of claim 1, wherein the imprinting the hologram setting up a wavefront in a holographic interferometer.

6. The method of claim 5, wherein imprinting the hologram with the desired optic pattern comprises rastering an incident light beam with phase control.

7. The method of claim 6, wherein rastering the incident light beam with phase control comprises:
   moving the substrate along a Z-axis in order to accurately position the substrate within focus;
   controlling polarization of the incident light beam; and
   moving the substrate along X- and Y-axes of motion to yield the hologram with the optic pattern.

8. The method of claim 6, wherein rastering the incident light beam with phase control comprises:
   controlling polarization of the incident light beam; and
   performing X-Y angle control of the incident light beam to accurately position the substrate within focus.

9. The method of claim 1, wherein the oscillator comprises a coherent local oscillator.

10. The method of claim 1, wherein imprinting the hologram with the optic pattern further comprises:
    splitting an ultraviolet light beam into a first beam and a second light beam;

adjusting a path of one of the first light beam or the second light beam; and subsequent to adjusting the path, recombining the first light beam and the second light beam.

11. The method of claim 1, wherein the applying at least one layer of mesogen material comprises applying at least two orthogonally oriented layers of mesogen material over the alignment layer.

12. The method of claim 1, further comprising positioning a retarder between the layer of reflective material and the alignment layer.

* * * * *